Figure 1:
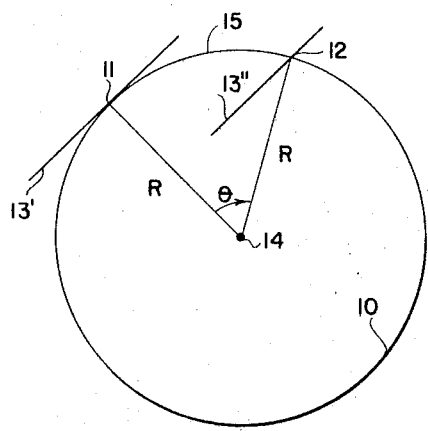

Feb. 21, 1967    CARL-ERIK GRANQVIST    3,304,788
EARTH ROTATION COMPENSATING IN INERTIA NAVIGATION
Filed Feb. 3, 1961    3 Sheets-Sheet 1

INVENTOR
CARL E. GRANQVIST

BY *Larson and Taylor*

ATTORNEYS

United States Patent Office 3,304,788
Patented Feb. 21, 1967

3,304,788
EARTH ROTATION COMPENSATING IN
INERTIA NAVIGATION
Carl-Erik Granqvist, Lidingo, Sweden, assignor to AGA Aktiebolag, a corporation of Sweden
Filed Feb. 3, 1961, Ser. No. 86,975
Claims priority, application Sweden, Feb. 8, 1960, 1,222/60
13 Claims. (Cl. 74—5.4)

In connection with the continuously increased speeds at which airplanes fly, inertia navigation has gained increasing use. Inertia navigation in short terms means that for determining a direction, an acceleration, a speed, and a position, one uses the specific effect of a gyroscope, which means that this is rotating under given circumstances in a level which is fixed in space, and which does therefore not rotate with the rotation of the earth. When a displacement takes place between the earth's surface and the craft on which the gyroscope is carried, the reference level for the rotation of the gyroscope, the so-called gyroplatform will therefore enter into positions, in which the perpendicular against the gyro-platform forms a successively variable angle with the vertical onto the centre of the ground or, in other words, the ground radial direction. This is the angle which is used in inertia navigation for the different purposes of navigation.

The arrangements for inertia navigation hitherto used, as a rule, were based on the idea of comparing the position of the gyro-platform with the position of an accelerometer, by which one understands an instrument, in the simplest case a pendulum which has the ability to indicate the direction to the center of the earth, when the vessel moves at constant speed and course, but, when the vessel is accelerated or retarded, deviates therefrom by an angular amount which is determined by the numerical value of the acceleration or the retardation, respectively. It should be observed, that a change of direction always can be revalued into an acceleration or a retardation in a direction, placed in a level, perpendicular to the direction of movement. The accelerometer can, for instance, consist in a pendulum. Thereby one has caused the accelerometer to influence a servo motor device which in its turn resets the gyroscope in such a way that the gyroplatform has been brought to assume a position, perpendicular to the ground radial direction in any separate moment, and by measuring this reset movement or by integrating its amount, respectively, one was able to create an estimation about speed and way by which the vessel moved.

In another known arrangement of this kind, one has instead measured the power consumed in order of causing the gyro-platform to move into its position perpendicular to the ground radial direction.

The inventor of the present invention has further proposed, as more particularly shown in his copending application Serial No. 82,964, to combine a means driven by the gyroscope and a means driven by the accelerometer with a means determining the frequency of an oscillator, in such a way that the frequency of the oscillator will always assume a value indicative of the difference between the setting of the gyroscope and the accelerometer.

Independently of which one of the said methods of functions is used for the inertia navigation or if one uses some other method of functioning, it is in any case required to derive two orientation statements from the results obtained, for instance a statement about latitude and longitude or the like. Specifically, the arrangement will be simple, if the gyroscope creating the gyro-platform is hinged by a gimbal frame hinging with one inner and one outer gimbal frame, both in the starting position of the craft oriented in directions in the horizontal level and perpendicular to each other. The one shaft of the gimbal frame should then preferably be situated in the North-South-direction and the other shaft in the East-West-direction. As an alternative one may place the first mentioned shaft so that it falls parallel to the ground rotational axis. Also other alternative possibilities exist.

In a gyroscope of the kind contemplated it is important that the losses of power in the interior of the gyroscope be as small as possible. These losses of power in the first place are created by friction in the bearings of the gimbal frames, and also, to some extent, by air friction during the movement of said gimbal frames. Tests have proved that these friction losses get smaller if the gimbal frames of the gyroscope are in continuous movement, and for this purpose it has already been proposed, in one way or another, to load one gimbal frame in such a way that, due to precession forces, the other gimbal frame will be put into such continuous rotation. Gyroscopes of this kind are called "rate gyros."

Known rate gyros however do not rotate with an absolutely constant speed about the gimbal frame shaft thus rotating. When a rate gyro is used for inertia navigation, it is however, absolutely necessary that the rotational speed of the said gimbal shaft is practically absolutely constant, because otherwise the direction of the gimbal shaft in space would neither be fully fixed nor would it rotate with the known speed, and errors, which are too large, when read for the purpose of navigation, will be created.

The present invention refers to an arrangement for obtaining a fixed direction in space or, in order to compensate for the influence of the ground rotation, a direction in space rotating with known speed, for the purpose of inertia navigation by means of a gyroscope, containing a gyroscope rotor, carried up by means of two gimbal frames, one of which is subjected to a force, causing rotation of the other one by precession.

According to the invention, the gyroscope together with one gimbal frame, preferably its inner gimbal frame, is provided to be put in rotation around the other shaft, preferably the shaft connected to the outer gimbal frame, and the load of the first mentioned gimbal frame is arranged for resilient counter-action of the precession forces thereby occurring on said gimbal frame. The servo motor, which may be identical with the source of power, keeps the shaft of the last mentioned gimbal frame in rotation, thereby is arranged, guided by a scanning device of the resulting precession to determine the rotational speed of the shaft of the last mentioned gimbal frame.

The last mentioned shaft will either continuously have a component of direction in agreement with the earth rotational shaft or, during the movement of the craft, will accidentally assume a position in which such component of direction is present. Thereby, the earth's rotation will introduce a variation in the reading of the inertia navigation instruments.

This could be explained in the best way, if one assumes as an example, that an air-craft with equipment for inertia navigation is started on the Equator in order either to move with the rotation or against the rotation of ground, however still to follow the Equator. It should thereby be kept in mind that the speeds, with which inertia navigated air-craft usually move, are in the same order or magnitude as the peripheral speed of the ground at the Equator. Assuming, in order of further simplifying the deduction, that the air-craft speed relative to the surface of the ground is exactly equal to the rotational speed of the ground globe measured along the Equator, it is evident that the angle by which the gyro-platform will be inclined against the horizontal level will increase with the double speed of that corresponding to the proper speed of the air-craft when one flies with the rotation of the ground, but that this angle will remain constant and not change at all when ones flies against the rotational direction of the ground.

In reality, of course, circumstances are not at all so simple. Firstly, one will seldom or never fly along the Equator but according to some deliberate great circle, when the distances of transportation are not great, otherwise one flies along a loxodromic curve. Secondly, one is not always on the zero latitude, but one will be positioned during the flight on varying latitudes. Thirdly, probably the air-craft speed is not exactly equal to the proper speed of displacement of the ground surface.

All this causes, that regard must be taken to the displacement of the position of the gyro-platform in space, caused by the rotation of the ground, before one can draw any conclusions of the position of the gyro-platform for navigational purposes. This can be done by calculation, but because inertia occurs primarily on very rapidly moving vehicles, it is preferable that it be done automatically.

The simplest way of automatically providing the said compensation would certainly be to provide the gyroscope with a resetting device for one of its gimbal frames, viz. the one, which is turnable about a shaft, having its extension in a direction with a component of direction parallel to the ground rotational shaft, and to cause this resetting device to be controlled by a clock. This clock must then run one turn during the same time, during which the ground rotates one turn, and therefore at least at the Equator a simple resetting mechanism would be obtained. At other latitudes a corresponding reduction of the resetting speed must take place. Such an arrangement would, however, not be good in practice because one condition for its function is that the gyroscope rotor is really with a satisfactory accuracy retaining its direction in space, which is never exactly the case due to the occurring unbalances, frictions in the hinging arrangements of the gimbal frames and so on.

A navigational chronometer of normal quality should not have greater errors, when it is newly trimmed, than one second during 48 hours. In practice, one may scarcely calculate with said chronometer continuously maintaining this accuracy, but one should nevertheless have a right to expect that the error should not be greater than one second in 24 hours or in other words, the error would not be greater than $10^{-5}$ of the chronometer running time. This accuracy should be obtained, also if one had not taken any specific steps for keeping the chronometer under constant temperature or pressure, but on the other side, the chronometer must of course be gimbal-hinged, so that it will continuously assume a constant position relative to the horizontal level. If one causes the inertia navigation device to influence a counter for indicating a position, in which one of the gimbal frame shafts, for instance the shaft of the outer gimbal frame, is rotating with a speed of for instance one turn per minute, then the same accuracy will give an error after one hour or 60 turns of only 0.2°. Such a small error is fully allowable as compared with other errors occurring in an inertia navigation device.

This accuracy, however, cannot be retained without considerable difficulty in an arrangement, which is controlled exclusively by mass forces, and it is therefore possible to use the above mentioned rotation which takes place with a constant speed, for automatic compensation of the influence of the proper ground rotation.

According to a specifically advantageous form of execution of the present invention an oscillator is provided for controlling the different functions which occur, and the rotor of the gyroscope is arranged to be driven by a synchronous motor, which gets its current from the said oscillator.

In this arrangement, the oscillator frequency will usually be essentially different from any frequency which can be derived by reasonable means from the rotating gimbal shaft. In order to compensate for this difference in order of magnitude between the two frequencies to be mutually compared, one may connect an arrangement for frequency division into an output conduit from the oscillator to an arrangement for reading the rotation of the gimbal frame, so that a current is created in the said arrangement for reading the rotation of a gimbal frame, corresponding to the frequency difference between the current from the reader or scanner arrangement, on the one hand, and the current from the frequency divider, on the other hand. The said current is fed to the servo motor for resetting the gimbal shaft, and said resetting movement is transferred to reading means.

By causing a very small difference between the frequency of the oscillator, being divided down to a smaller value on the one hand, and the frequency derived from the rotating gimbal shaft on the other hand, one may cause a rotation derived from this difference in frequency, which is equal to or proportional to the ground proper rotational speed, so that this rotation can be used for compensation of the influence from the proper ground rotation on the magnitudes used for inertia navigation. In this case, however, the gyroscope together with its gimbal frames must be built up on a material platform, which, in its turn, is adjustable by means of gyro compasses or similar compasses, so that the rotation concerned will take place about an axis which is parallel to the ground rotational axis or possibly forms a known angle difference from 90° with the said ground rotational axis.

Figure 2:
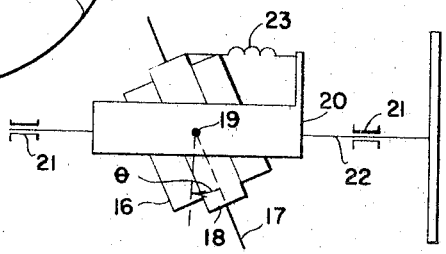
Figure 3:
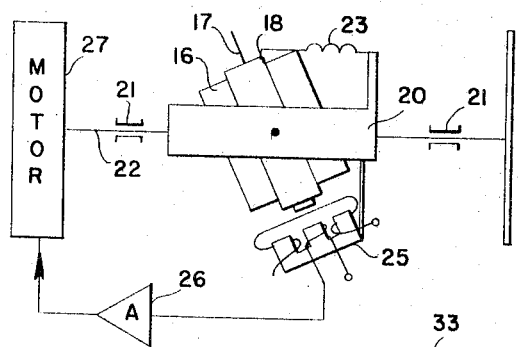
Figure 4:
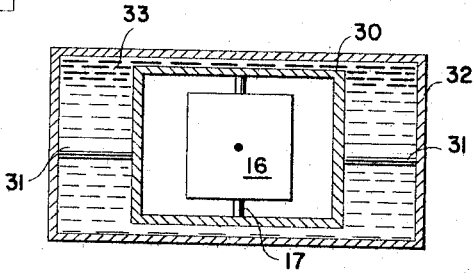
Figure 5:
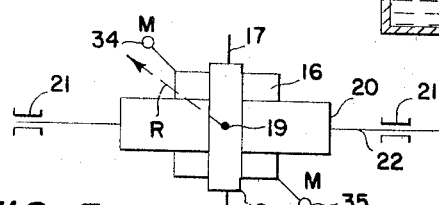
Figure 6:
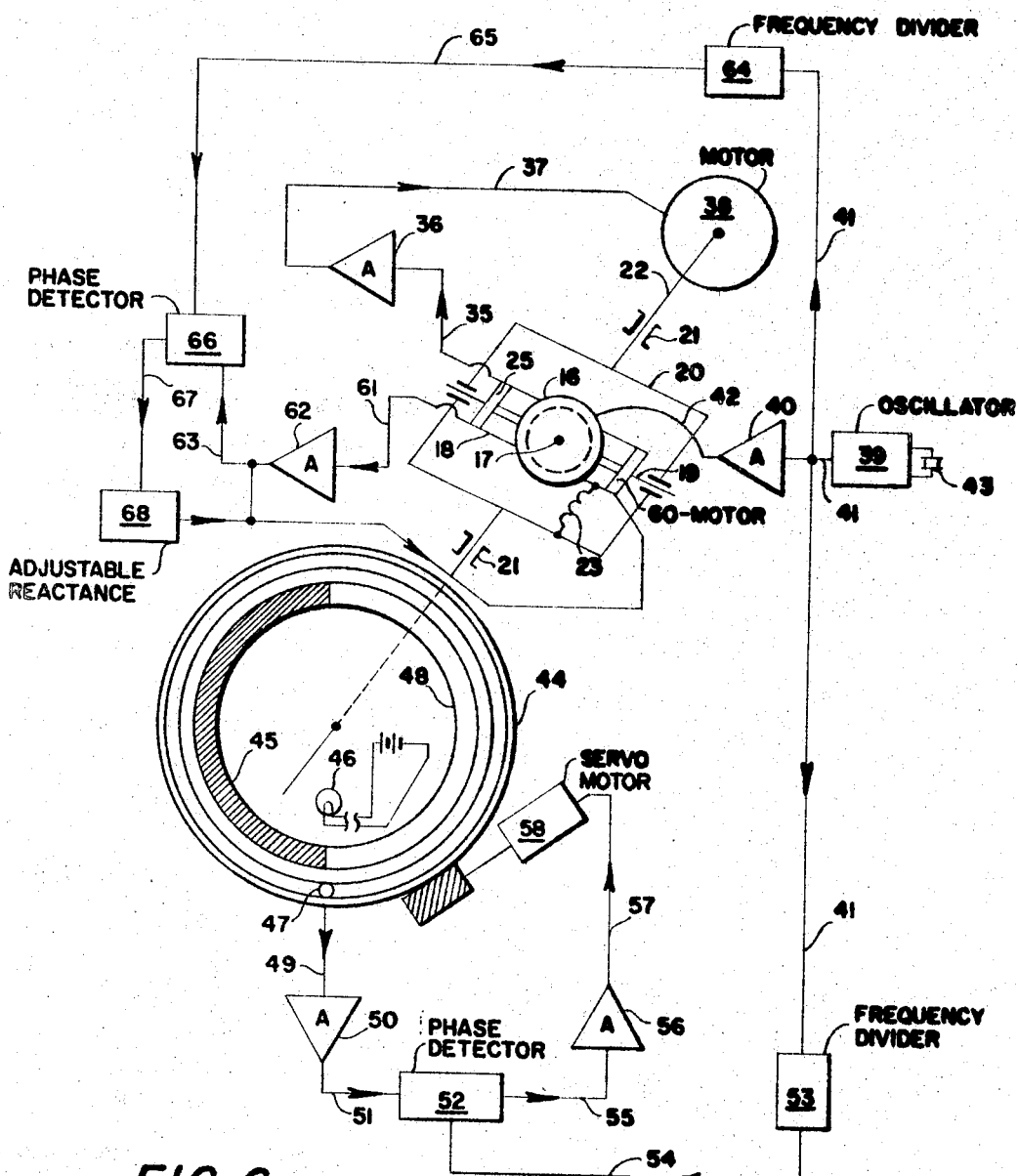
Figure 7:
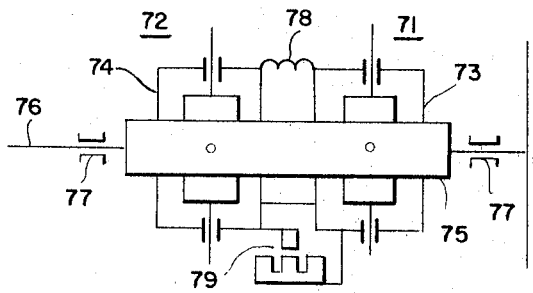
Figure 8:
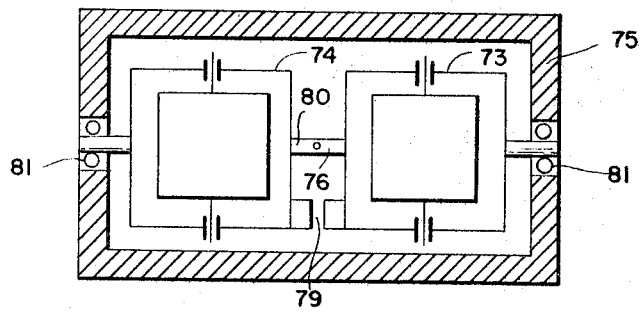

The invention will be further described below in connection with the attached drawing, in which FIG. 1 shows a simple sketch of the ground globe, for explaining the meaning of the conception of inertia navigation, whereas FIG. 2 shows a sketch for explaining the basic principles of the present invention. FIG. 3 shows an arrangement according to the invention in a simplified and schematic form, whereas FIG. 4 shows an arrangement for bearing the gyroscope rotor. FIG. 5 shows an arrangement corresponding to the one according to FIG. 2, but as spring force for providing the resetting moment is used in FIG. 2, centrifugal force is used for the same purpose in the arrangement according to FIG. 5. FIG. 6 shows a complete system according to the invention, intended for inertia navigation. This arrangement agrees with the arrangement according to FIGURE 3, but in addition thereto further details are added in part in block diagram. FIG. 7 shows in schematic form a modification of the arrangement according to FIG. 6 for two gyroscopes in counter-coupling. FIG. 8 shows an arrangement for two gyroscopes, to some extent corresponding to the one according to FIG. 7, in which the gyroscopes are however geared in the way shown in other respects in FIG. 4.

In FIG. 1, 10 is a great circle on the surface of the globe. For simplification of the explanation it is assumed that an aircraft is moving at such a low altitude above the ground surface, that this altitude can be disregarded, as compared with the ground radius. The aircraft is assumed to move from the position 11 to the position 12. I start with disregarding the simultaneous proper rotation of the ground, but I will later return to this. For amplifying the deduction, the gyroscope on board of the aircraft is assumed to have been set in such a way that its rotational level agrees with a tangential level of the globe, or in other words, that its rotational axis agrees with the ground radial direction. In reality this is not at all necessary. One has built up a gyro-platform represented by the level 13'. The aircraft is assumed thereafter to move along the ground surface to the position 12, whereby it has turned an angle in relation to the centre 14 of the ground equal to $\theta$. The gyro-platform, however, thereby is in standstill in the space, so that it will in the position 12 of the aircraft assume the position 13″, in which it forms an angle with the ground radial direction of $90° - \theta$.

Simultaneously, however, the accomplished distance $d$, measured along the great circle is $$d = R \cdot \theta$$

further, disregarding the influence of the proper rotation of the ground, the mean speed of the movement along the great circle is $$v = R \frac{d\theta}{dt}$$

In both of these equations R is the globe radius. It is seen from the above, that by comparison between a gyroscope with a rotational axis which is for instance vertical from the beginning of the movement, and which is allowed to be in standstill in the space; from a pendulum or other means for indication of the ground radial direction, one can measure the angle $\theta$ and by means of this and $dt$ determine the mean flight speed as well as the great circle distance. This kind of navigation has been called inertia navigation.

In order to carry the discussion on, it is assumed that the great circle shown in FIG. 1 agrees with the Equator, and then it is evident that, as a matter of fact, the movement from the place 11 to the place 12 must be regarded as a movement relative to a fixed point in space, but not as a movement in relation to a point on the ground surface. In other words, the way of movement from the place 11 to the place 12 is composed of two components, viz. the ground rotation during the flight time, which may be assumed to be represented by the distance from the point 11 to the point 15, and the movement of the aircraft relative to the globe which may be assumed to be represented by the distance from the point 15 to the point 12, provided that the ground rotates in the same direction as the one in which the aircraft moves. The thing which is of interest to the pilot on the aircraft in the navigation thereof, of course, is not the distance between the points 11 and 12 but the real distance in relation to the ground surface which he has traversed, that means the distance betwen points 15 and 12.

However, the flight will rather seldom follow the Equator in the direction of the rotation. If accidentally the flight should follow the Equator against the direction of the rotation one has obviously to add to the distance marked by the gyroscope in inertia navigation the simultaneous rotational displacement of the ground surface along the Equator. If the flight should follow another parallel than the Equator, for instance the parallel $\phi°$ then one has to add or subtract, respectively, a rotational movement equal to $R \cdot \cos \phi°$, provided that the flight takes place along the loxodrome. In reality this condition is rather well satisfied at shorter flights with a given approximation, however less well satisfied at longer flights, because it may be supposed that the pilot in known manner, when flying longer distances, prefers to follow the shorter great circle, but there will usually be no greater difference created therefrom. This difference, further can be easily calculated. Should finally the flight take place along a loxodromic curve or a great circle, which is not in agreement with a parallel, then one will have in order of correcting for the ground rotation to divide the passed distance into its parallel component and its meridian component. Only the parallel component of the flown distance is of interest in connection with compensation for the rotation of the ground. The division, in the simplest way, takes place by hinging the used gyroscope together with its gimbal frames in an outer gimbal system and controlling the gimbal shafts of the outer system by means of a gyro-compass or another sufficiently exact compass arrangement in such a way that the one will always allow for a turning in a level which contains the ground rotational shaft, whereas the other one will always turn in a level perpendicular thereto. The turning of the latter gimbal shaft will then alone contain the parallel component.

In FIG. 2 including the inner gimbal frame system a gyroscope including the inner gimbal frame system is schematically shown with a rotor 16, rotating about a shaft 17. This is journaled in the inner gimbal frame 18, which, under influence of the precession moment will turn around the shaft 19, and this shaft, in its turn, is journaled in the outer gimbal frame 20, which is brought to rotate about the shaft 22, journaled in the foundation 21, with the above mentioned low speed of, for instance, one turn per minute. The gimbal frames could possibly be controlled in the above indicated way by means of an outer gimbal system and a gyro-compass, and it is then evident, that the turning of the inner gimbal frame 18 about the shaft 19 is the one, which will contain the influence of the ground rotation, which has in FIG. 1 been expressed by the angle $\theta$.

The invention now is based upon the idea that one shall apply a counter-force against the turning movement about the shaft 19. Schematically this counter-force may be represented by a spring 23, applied in the way shown in FIG. 2. For its play of forces the following laws will apply, provided that the magnitudes occurring in the equations have the following meaning:

$M_p$ = precession moment of the gyroscope
$\alpha$ = turning angle of the gimbal shaft 22
$\omega_0$ = rotational speed of the gyroscope
$\theta'$ = inclination angle between the shaft of the gyroscope and the vertical
$I_p$ = inertia moment of the gyroscope rotor
$e$ = elongation of the spring 23
$m$ = mass of the gyroscope rotor
$r$ = inertia radius of the gyroscope rotor The formula for the precession moment will then be:

$$M_p = \frac{d\alpha}{dt} \cdot \omega_0 \cdot I_p \cdot \cos \theta' \tag{1}$$

Simultaneously a moment is obtained from the spring 23 which is now extended, said moment balancing the precession moment, and therefore one will obtain:

$$\frac{d\alpha}{dt} \cdot \omega_0 \cdot I_p \cdot \cos \theta' = k \cdot e \cdot \sin \theta' \tag{2}$$

The inertia moment of the gyroscope rotor, however, can also be expressed as the mass $m$ multiplied with the square of the inertia radius $r$ from which one will obtain the following form for the balance equation:

$$\frac{d\alpha}{dt} \cdot \omega_0 \cdot m \cdot r^2 \cdot \cos \theta = k \cdot e \cdot \sin \theta' \tag{3}$$

In the Equations 2 and 3 $k$ indicates an arbitrary constant. From the Equation 3 one then obtains:

$$\frac{d\alpha}{dt} = \frac{k \cdot e}{\omega_0 \cdot m \cdot r^2} \cdot \tan \theta' \tag{4}$$

From the Equation 4 it is evident, that if the different purely mechanical factors are constant, amongst which is also the rotational speed of the gyroscope rotor, then any turning of the gimbal shaft 22 will cause a change of the angle $\theta'$ according to the equation:

$$\frac{d\alpha}{dt} = C \cdot \tan \theta' \tag{5}$$

in which equation C is a constant.

In the construction shown in FIG. 2 the spring 23 is a symbol of any spring force. It must not necessarily be made in the form of a spiral spring but it may have any suitable form. An especially suitable form of the spring is to execute it as a torsional spring, because thereby one will make a construction possible, in which the one end of the torsional spring is hinged in the gambal frame 20 and the other one is hinged in the foundation, thereby decreasing any bearing friction in the carrier shaft. The arrangement according to FIGURE 2 is known. It acts in such a way, that by the torque, created by the spring 23 on the inner gimbal frame 18, the precession force is exerted on the outer gimbal frame 20, by which this frame is put into rotation around the shaft 22 in a way which is known from the so-called rate gyros. This rotation, however, takes place with a number of revolutions per unit time, which is not sufficiently constant for inertia navigation. The variation in the first place depends upon power consumption occurring in the bearings 21 of the shaft 22. In order to compensate for this consumption of power, there is provided between the inner and the outer gimbal frames 18 and 20 respectively, a reader or scanning device 25, the output terminals of which are connected to an amplifier 26, and this in turn drives a motor 27, which is connected to shaft 22, so that a torque is applied to the shaft 22, which compensates for the friction losses and other losses of power.

One can now easily, knowing the normal dimensions of gyroscopes of the kind concerned, calculate what accuracy is obtained, providing for instance a magnetic scanning device in the way, shown in FIGURE 3, for measuring the turning movement of the gimbal shaft, as indicated in FIG. 3 by 25, and causing this to work on a diameter of 100 mm. or on a radius of 50 mm., one will with normal arrangements obtain an accuracy of $1:10^{-5}$ or $1:10^{-6}$, which is of the same order of magnitude as the earlier mentioned degree of accuracy. Of course, the voltage from the magnetic reading arrangement 25 must be amplified in normal electronic amplifiers for creating the required power.

An arrangement, in which the spring is made in the form of a torsion spring, is shown in FIG. 4. The gyrorotor 16, rotates about its shaft 17 in a closed cylinder 30, which forms the inner gimbal frame. This cylinder 30, in its turn, is hinged by means of the torsion resilient shaft 31 in the interior of a second closed vessel or casing 32 forming the outer gimbal frame. The space between the two closed gimbal frames 30 and 32 is filled with a fluid 33 of a suitably chosen specific weight, so that the construction of the gyro rotor 16, the shaft 17, the inner gimbal frame 30 and the shafts 31 will be kept swimming in substantially equality of balance. Thereby any hangdown of the shafts 31 will be avoided, said shafts having to be made rather weak in order of giving the correct torsion resilient properties.

It is evident from Equation 5 above that one may by the shown construction of a resilient load, tending to drive the one gimbal frame of the gyroscope in a given direction, counter-act the occurring precession moment, which is caused by a turning of the gimbal frame with an extremely constant rotational speed. Thereby, the gimbal frame will assume a position of balance. The rotation of the kind here concerned, however, cannot only be caused by a resilient load of one of the gimbal frames but a fully corresponding effect may be provided by certain other kinds of forces. It is important that one shall avoid any such forces which are not desirable, as that some of the forces concerned may be used instead of the above mentioned resilient force.

Experience has proved that the disturbing forces, which usually cause changes in the rotational speed of the shaft 22, and thereby displacements of the position in space of the gyroscope, consist not only in frictional forces in the bearings of the gimbal shafts but also in eccentricities regarding the gravity point position. These two influences are further decreased by the arrangement according to FIGURE 4. The shafts 31 have no bearings, because they are resilient under torsion, and no losses in power are therefore created in any bearings, so that the friction losses limit themselves to interior friction.

Eccentricity regarding the position of the gravity point of the rotor of the gyroscope may be prevented in the new and unused gyroscope by a careful centration, but such eccentricity will, as a rule, sooner or later be created due to wearing of the bearings. As any such eccentricity will in the present case during the one half turn of the rotor of the gyroscope cooperate with the resilient force, desired in this case, but during the other half turn of the rotor of the gyroscope counteract this resilient force, the influence of the eccentricity is self-compensating. This, however, will not be the case regarding eccentricity in the hinging of the gyroscope rotor, especially the position of the inner gimbal frace in space, but such eccentricity will get no importance in the arrangement according to FIG. 4, because in this arrangement there is balance regarding the specific weight.

It was mentioned above that one can get the same action, which was obtained by resilient force in the shown arrangement, also by other kinds of forces. In the first place centrifugal force will be regarded as created due to eccentric hinging. For explanation of this effect, reference is made to FIG. 5. In this figure the reference numerals 16–22 have the same meaning as in FIG. 2. It is further assumed, that the rotor of the gyroscope is eccentrically mounted, so that it can be reduced to a concentrically mounted rotor and to mass bodies 34 and 35 having the mass M on the radial distance R from the centre of the axis of the shaft 19. Maintaining in other respects the indications of formulae, used in the Formulae 1–5, one will obtain the following expression for the derivative of rotation of the gimbal shaft 22:

$$\frac{d\alpha}{dt} = \omega_0 \cdot \frac{r^2}{e^2} \cdot \frac{m}{M} \cdot \frac{2}{\sin \theta^1} \tag{6}$$

It should be observed, how exactly symmetrical the Equation 6 is. This is a great advantage, because if the material in the rotor of the gyroscope is unitary, obviously the relation between $r^2$ and $e^2$ will not be subjected to any changes depending upon variations in temperature. The arrangement, however, has a rather limited usability, because it can only be used for rather large gyroscopes as a rule, rather than for small gyroscopes of the type usually used for navigation on board of aircrafts, because the mass causing the centrifugal force will in such gyroscopes assume a too dominating order of magnitude. Solving the Equation 6 with regard to the maximum value of the mass M creating the centrifugal force, one will, provided $\sin \theta$ can be put =1, obtain the expression:

$$M = \frac{\omega_0}{\frac{d\alpha}{dt}} \cdot \frac{r^2}{e^2} \cdot 2m \tag{7}$$

For such a smaller gyroscope just mentioned, for instance, $d\alpha/dt$ may be 1 turn per second and $\omega_0$ may be 200 turns per second, and the weight of the gyroscope rotor may be 0.1 kilograms with an inertia radius of 3 cm. The radius of the centrifugal mass may further be assumed to be in the order of magnitude of 5 cm. If these values are inserted in the Equation 7 above, then one will get a weight of the centrifugal mass of about 14 kilograms, which will cause unpractical dimensions.

However, in such a case one may use a combination between resilient spring force according to the proposal first made above, and centrifugal force according to the latter proposal.

FIGURE 6 shows an arrangement according to FIGURE 3 with additional means for reading the output for the purpose of inertia navigtion. This arrangement in practical use has proved to have exceedingly good working properties.

In the arrangement according to FIG. 6, using the same reference numerals as used before, the rotor of the gyroscope has been indicated by 16. This rotor 16 rotates about a shaft 17, which is mounted in the inner gimbal frame 18. Its turning shaft 19 is, in its turn, mounted in the outer gimbal frame 20, carried by the shaft 22, which is mounted in the bearings 21. A pick off 25 is provided in the same way as shown in connection with FIG. 3. The voltage from the pick off is conducted by means of the conductors 35 to an amplifier 36, corresponding to the amplifier 26 in FIGURE 3, the output voltage of which is brought over the conductor 37 to the motor 38, corresponding to the motor 27 in FIGURE 3, which keeps the shaft 22 in rotation.

The rotor of the gyroscope suitably may be formed by the rotor of a synchronous motor, which is driven by means of the voltage from an oscillator 39, the output voltage of which is transferred to an amplifier 40 over the conductor 41 and from the amplifier 40 to the synchronous motor. For the purpose slip rings are required, but as this is obvious to any man skilled in the art, they have in order to simplify the explanation, not been shown in the drawings, where the conduits to the synchronous motor have schematically been shown by means of the conduit 42. The oscillator 39 advantageously may be arranged to maintain with a high degree of accuracy a constant frequency, said oscillator for that purpose being controlled from a crystal 43.

This arrangement causes the rotor of the gyroscope to rotate with a rotational speed, which is constant to a high degree. Also the rotational speed of the shaft 22 is constant to a corresponding degree.

On the shaft 22, a disc 44 is provided, and it is thereby made in the form of a contact disc for a purpose, further explained below. Although a purely electrical contact arrangement could be used, this will cause friction forces, which are less desirable, and for that reason an optical and thus frictionless contact device has been used. For this purpose the disc 44 has been divided into two concentrical parts, and on the inner part 48 half of the periphery is blackened, as indicated at 45. One further provides a fixed source of light 46 on the outer part, as well as a photo-cell 47, from which one will consequently, during the rotation of the disc 48 obtain a voltage in the form of rectangular pulses in time with the rotation of the inner disc 48.

The voltage from the photo cell 47 is conducted over the conductor 49 to an amplifier 50, the output voltage of which runs over the conductor 51 to a phase detector 52, which is also fed with the voltage from the oscillator 39 over the conductor 41. The two frequencies, however, being of essentially different order of magnitude, a devider device 53 has been connected into the conductor 41 for dividing the frequency of the oscillator 39 down to an order of magnitude, which is commensurable with the frequency from the photo cell 47, and this decreased frequency is then fed over the conductor 54 to the phase detector 52. Upon a difference in phase, created by a vessel with the arrangement according to FIGURE 6, having moved over the ground surface, a voltage is created in the phase detector 52, which is as to its magnitude, an indication of the difference in phase, and as to its direction an indication of the direction of the phase difference. The output voltage of the phase detector 52 is conducted over the conductor 55 to an amplifier 56, and from this over the conduit 57 to a servo motor 58 for resetting the disc 44 relative to the disc 48. In this way a fixed position will be created between the discs 44 and 48, as well as the photo cell 47, and this position will be retained by a high grade of accuracy. The servo motor 58 also drives a reading instrument which is, however, not shown in the drawing.

By the above described arrangement the device is independent of possible variations in the frequency of the oscillator 39. If this frequency should change in the one direction or the other, then the rotational speed of the shaft 22 will increase or decrease proportionally, and the consequence will be, that the voltages acting on the phase detector 52 will still be in a commensurable order of magnitude, and the arrangement will function with retained accuracy. It is also obvious that one may determine the speed of rotation of the discs 44, 48 by selecting the dividing of the frequency in the apparatus 53, and it is thereby possible to superimpose on the displacement caused by the movement over the ground surface a displacement movement, determined by the choice of the tension in the spring 23 as well as the degree of frequency decreasing in the apparatus 53, said displacement movement being equal to the one which is required for compensation of the influence of the proper ground rotation.

In FIG. 6 the arrangement of the discs 44, 48 has been schematically shown in such a way that an angle of 180° around the circumference of the disc 48 is blackened, whereas the remaining angle of 180° is light. In other words one could say that the discs 44, 48 regarded as an electrical contact device have one pole per turn. However, one can give the device a deliberate number of poles per turn or in other words a deliberate number of blackened sectors. It is especially advantageous to provide the disc 48 with 360 blackened sectors, each having an extension of ½° with an equal number of light sectors of the same extension between them. One will then get one such sector per degree of the meridian network of the ground. Tests have proved that one can in this way maintain an accuracy of some few hundredth parts of degrees per turn round the ground or in other words an accuracy, the maximum error of which would normally even be less than one distance minute per turn round the ground, measured along the parallel of the latitude, where one is situated. By the indicated arrangement, however, one will run the risk that the indication is misunderstood as regards one or more full degrees, and one may then provide a further disc, similar to the disc 48, with its own photo cell, but with a less number of degree markings, for instance one marking for each ten degrees or in total 36 such markings. The pulses from the two discs could easily be carried on to a suitable counter, which will indicate by means of two figures on which meridian one is situated. In a corresponding way one could obtain a three figured indication by arranging a third disc of exactly the same form of execution, which is shown as far as regards the disc 48 in FIG. 6.

The gyroscope 16-22 in this arrangement is provided with an eccentrically arranged mass, so that a centrifugal force will be developed according to the Equation 6 above, and also with a spring 23, which may preferably be made in the form of a torsional spring in the specific way, shown in FIG. 4. For obtaining the maximum possible accuracy, it is of some importance that the relation between the inertia moment of the gyroscope rotor, on the one hand, and the torsional moment from the spring, on the other hand, should be as constant as possible. Now, the inertia moment of the gyroscope rotor in the direction of the gimbal shaft is equal to half of the polar inertia moment. To this, however, also the inertia moment of the gyroscope casing adds, but this can be regarded as small, compared with the remaining occurring magnitudes. Due to all of these circumstances there is a risk for self oscillation occurring in the gimbal system. This would in usual cases, see for instance FIGURE 2, rather rapidly be dampened down and disappear, but due to the servo circuit 25-26-27, in FIGURE 3 or 25-36-38 in FIGURE 6 acting, as if the gimbal system had been free of losses, such self oscillation is not damped or is dampened much more slowly than in the arrangement according to FIGURE 6, when this is completed. One can therefore set the torsional moment in the shaft 31, FIG. 4, in such a way that the resonance frequency along the gimbal shaft is constant, and one has then also provided such a setting of the contained parts, that the rotational speed of the gimbal shaft is constant with the highest possible degree of accuracy.

For this purpose one may provide the gimbal shaft 19 with a moment motor 60. The arrangement for feeding this moment motor 60 consists in the following parts:

In addition to the voltage, conducted from the pick-off 25 through the conductor 35 to the amplifier 36, a separate voltage is also conducted from the reader device 25 over the conductor 61 to an amplifier 62, the output voltage of which is fed over the conductor 63 to the moment motor 60. Further the conductor 41 from the precession oscillator 39 is connected to a second frequency divider device 64, the output voltage of which over the conductor 65 has a frequency in agreement with the desired resonance frequency of the gimbal system. The conductor 65 is connected to a second phase detector 66, which is thus fed with the frequency controlled voltage from the conductor 65 as well as with the voltage of the resonance frequency of the gimbal system from the conductor 63, so that both of these frequencies are compared in the phase detector 66, and, if they should not be in agreement, cause a voltage in the output conduit 67 from the phase detector 66, said output conductor 67 running to an adjustable reactance 68 in parallel to the moment motor 60 by means of the conductor 63. The reactance 68 is so made, that when influenced over the conductor 67, it will be adjusted to such a value, that by negative reaction possible tendencies to self oscillation will immediately be suppressed, and an improved agreement will be created between the resonance frequency of the gimbal system, determined by the moment motor 60, on the one hand, and the control frequency from the frequency divider device 64, on the other hand.

The last mentioned arrangement is of essential importance for avoiding variations in the said frequency agreement as a consequence of temperature variations and changes resulting therefrom of the inertia moment as well as the torsion moment.

It is obvious that the arrangement of the variable reactance 68 in parallel to the moment motor 60 is only to be regarded as one of a multitude of possibilities for influencing and correcting the resonance frequency of the gimbal system, and that the output current from the phase detector 66 over the conductor 67 may with equal advantage be brought to other kinds of arrangements for the same purpose. For instance one can cause the voltage to influence an electromagnet, the armature of which is loaded with a spring. This spring may thereby be identical with the spring 23 which will thus be stretched to different extents, depending upon field intensity of the electromagnet or the current, respectively, which runs through the winding of the electro-magnet. The electromagnet, of course, can also consist of a core of magnetostrictive material without a separate armature.

In the hitherto described forms of execution of the invention, it has been assumed, that good stability is obtained of the gimbal shaft of the device, without other steps than the ones which have been described. One can, however, further improve the stability by arranging two gyroscopes in a tandem coupling in a way as shown in FIGS. 7 and 8. The two gyroscopes are in FIG. 7 indicated by 71 and 72, respectively. Their gyro rotors, however, rotate in mutually different directions. They are provided with individual inner gimbal frames 73 and 74, respectively, but these are supported in a common outer gimbal frame 75, which is brought to rotate about the shaft 76 in the bearing 77.

It is now obvious that the precession moments of the two gyroscopes tend to turn said gyroscopes in opposite direction, depending upon the opposite directions of rotation of the rotors. This tendency is counteracted by a spring 78, which is connected between the two inner gimbal frames 73 and 74. Further a pickoff 79 is provided for reading the mutual displacement between the two gimbal frames. The voltage from the reading arrangement is brought to some device for re-establishing the mutual position, for instance an arrangement according to FIG. 6.

The spring 78 in this connection is to be regarded as a symbol for a constructive spring, which may consist in a torsional spring in the above indicated manner.

Another constructive arrangement is shown in FIG. 8, in which a common torsional shaft 80 carries the two inner gimbal frames 73 and 74. It is mounted in two bearings 81 in the outer gimbal frame 75, and this in its turn is carried up a shaft, corresponding to the shaft 76, which is not visible in FIG. 8, because it runs perpendicularly to the plane of the paper. The pick off here as before is indicated 79.

The invention is of course not limited to the above described forms of execution thereof, shown in the drawings, but different modifications may occur within the frame of this invention as defined in the appended claims.

What is claimed is:

1. Apparatus for obtaining a fixed direction in space comprising a gyroscope rotor, a first gimbal supporting said rotor and a second gimbal journalling said first gimbal, said second gimbal being subjected to a precessional force generated by said rotor, means journalling said second gimbal about an axis perpendicular to the journal axis between said first and second gimbals, resilient means between said first and second gimbals, for counteracting said precessional forces, means operatively connected to said second gimbal for sensing the angle of precession and for generating a signal proportional thereto, and motor means connected to said signal generating means and responsive to said signal for rotating said second gimbal about the journal axis thereof.

2. The apparatus of claim 1, said resilient means comprising a spring.

3. The apparatus of claim 2, said spring being a torsional spring.

4. The apparatus of claim 3, said first gimbal and said rotor being in a liquid which upon displacement generates buoyant forces thereon.

5. Apparatus as in claim 1, said rotor having an eccentric mass.

6. Apparatus as in claim 1, and further comprising synchronous motor operatively connected to said rotor for driving said rotor, and oscillator means drivingly connected to said synchronous motor means.

7. Apparatus as in claim 6, and further comprising frequency divider means connected to said oscillator means and providing a second signal, means connected to said signal generating means and the output of said frequency divider means for determining difference in frequency between said first mentioned signal and said signal from said frequency divider means and for generating a signal proportional to said difference, and motor means operatively connected to said frequency difference determining means and drivingly connected with said sensing means and responsive to said last mentioned signal for resetting said sensing means.

8. Apparatus in claim 7, and further including second frequency divider means connected to said oscillator means and providing a fourth signal, means operatively related to said first and second gimbals for sensing movement between said first and second gimbals and for generating a fifth signal proportional thereto, means connected to the output of said second frequency divider means and said means for generating said fifth signal for determining difference in frequency between said fourth and fifth signals and for generating a signal proportional to said difference, and motor means operatively connected to said second mentioned frequency difference determining means and drivingly connected to said first gimbal and responsive to said last mentioned signal for applying a torque to said first gimbal.

9. Apparatus as in claim 7, in which said sensing and generating means comprises disc means rotatable with said second gimbal.

10. Apparatus as in claim 9, said disc means having fields of contrasting optical qualities, and said generating means including a photo-cell.

11. Gyroscopic apparatus comprising a first and second rotor journaled in a pair of first gimbals, a second gimbal journaling in parallel said pair of first gimbals, means journaling said second gimbal, means for driving said rotors in opposite directions, resilient means between said pair of gimbals for counteracting precessional forces, means operatively connected to said pair of first gimbals for sensing relative displacement between said pair of first gimbals and for generating a signal proportional thereto, and means operatively connected to said signal generating means and to at least one of said pair of first gimbals and responsive to said signal for diminishing relative displacement of said pair of first gimbals.

12. Apparatus as in claim 11, said resilient means comprising a torsional spring.

13. Apparatus as in claim 11, said sensing and generating means being between said pair of first gimbals.

No references cited.

FRED C. MATTERN, JR., *Primary Examiner.*
BROUGHTON G. DURHAM, *Examiner.*
K. DOOD, P. W. SULLIVAN, *Assistant Examiners.*